(12) United States Patent
Uchida

(10) Patent No.: US 8,982,249 B2
(45) Date of Patent: Mar. 17, 2015

(54) IMAGE CAPTURING APPARATUS AND METHOD FOR CONTROLLING AN IMAGE CAPTURING APPARATUS FOR CAPTURING AND PROCESSING A PLURALITY OF PIECES OF EXPOSURE AND DARK IMAGE DATA TO CORRECT COMBINED EXPOSURE IMAGE DATA IN ACCORDANCE WITH COMBINED DARK IMAGE DATA

(71) Applicant: Canon Kabushiki Kaisha, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 13/646,895

(22) Filed: Oct. 8, 2012

(65) Prior Publication Data
US 2013/0093909 A1    Apr. 18, 2013

(30) Foreign Application Priority Data
Oct. 12, 2011   (WO) .................. PCT/JP2011/073385

(51) Int. Cl.
| | |
|---|---|
| H04N 9/64 | (2006.01) |
| H04N 5/235 | (2006.01) |
| H04N 5/365 | (2011.01) |
| H04N 5/232 | (2006.01) |
| H04N 5/361 | (2011.01) |

(52) U.S. Cl.
CPC ............. *H04N 5/2355* (2013.01); *H04N 5/365* (2013.01); *H04N 5/23232* (2013.01); *H04N 5/361* (2013.01)
USPC ....................................... 348/243; 348/229.1

(58) Field of Classification Search
CPC .............. H04N 5/2355; H04N 5/2356; H04N 5/23232; H04N 5/35572; H04N 5/361; H04N 5/365; H04N 5/3655; G60T 5/50
USPC ........................... 348/243, 229.1, 230.1, 362
See application file for complete search history.

(56) References Cited

U.S. PATENT DOCUMENTS

| | | | | |
|---|---|---|---|---|
| 6,563,536 | B1 * | 5/2003 | Rashkovskiy et al. ......... | 348/243 |
| 6,710,807 | B1 * | 3/2004 | Yamagishi .................... | 348/362 |
| 6,710,808 | B1 * | 3/2004 | Yamagishi .................... | 348/362 |
| 6,747,696 | B1 * | 6/2004 | Nakata et al. ................. | 348/243 |

(Continued)

FOREIGN PATENT DOCUMENTS

| | | | |
|---|---|---|---|
| JP | 62-285583 | A | 12/1987 |
| JP | 2002135661 | A * | 5/2002 |

(Continued)

*Primary Examiner* — John Villecco
(74) *Attorney, Agent, or Firm* — Canon USA, Inc., IP Division

(57) ABSTRACT

Image capturing is performed with an image pickup element being exposed to light, whereby a plurality of pieces of exposure image data are obtained. Image processing is performed on the plurality of pieces of exposure image data. The plurality of pieces of exposure image data output are combined into combined exposure image data. A plurality of pieces of dark image data are obtained and one piece of dark reference image data is generated. Image processing that uses a parameter based on the image processing performed on each exposure image data is performed on the one piece of dark reference image data, whereby a plurality of pieces of processed dark image data are output. The plurality of pieces of processed dark image data are combined into combined dark image data. The combined exposure image data is corrected in accordance with the combined dark image data.

14 Claims, 14 Drawing Sheets

(56) References Cited

U.S. PATENT DOCUMENTS

| | | | |
|---|---|---|---|
| 6,956,978 B2 * | 10/2005 | Staudacher et al. | 348/243 |
| 6,965,410 B1 * | 11/2005 | Yamagishi | 348/243 |
| 6,982,757 B2 * | 1/2006 | Tariki | 348/243 |
| 7,023,479 B2 * | 4/2006 | Hiramatsu et al. | 348/243 |
| 7,136,100 B1 * | 11/2006 | Kato et al. | 348/243 |
| 7,339,620 B1 * | 3/2008 | Yamagishi et al. | 348/243 |
| 7,554,585 B2 * | 6/2009 | Masuyama | 348/243 |
| 7,782,377 B2 * | 8/2010 | Miyanari et al. | 348/243 |
| 7,782,379 B2 * | 8/2010 | Sato | 348/243 |
| 7,804,533 B2 * | 9/2010 | Oshima | 348/243 |
| 7,856,174 B2 * | 12/2010 | Tanaka et al. | 396/55 |
| 7,948,531 B2 * | 5/2011 | Tanizoe et al. | 348/243 |
| 8,040,403 B2 * | 10/2011 | Sakamoto et al. | 348/243 |
| 8,081,220 B2 * | 12/2011 | Kawai | 348/208.12 |
| 8,090,181 B2 * | 1/2012 | Omi | 382/132 |
| 8,237,812 B2 * | 8/2012 | Kita et al. | 348/229.1 |
| 8,743,241 B2 * | 6/2014 | Lesiak et al. | 348/229.1 |
| 2003/0179302 A1 * | 9/2003 | Harada et al. | 348/231.6 |
| 2004/0032490 A1 * | 2/2004 | Uchida | 348/96 |
| 2004/0032940 A1 | 2/2004 | Gray | |
| 2004/0165101 A1 * | 8/2004 | Miyanari et al. | 348/363 |
| 2005/0231615 A1 * | 10/2005 | Kitani | 348/243 |
| 2005/0253934 A1 * | 11/2005 | Yamagishi et al. | 348/222.1 |
| 2005/0253935 A1 * | 11/2005 | Hiramatsu et al. | 348/222.1 |
| 2008/0074514 A1 * | 3/2008 | Harada et al. | 348/243 |
| 2008/0111903 A1 | 5/2008 | Makino et al. | |
| 2010/0182451 A1 | 7/2010 | Kita et al. | |
| 2013/0093912 A1 * | 4/2013 | Uchida | 348/222.1 |

FOREIGN PATENT DOCUMENTS

| | | | |
|---|---|---|---|
| JP | 2003-333434 A | | 11/2003 |
| JP | 2004-207895 A | | 7/2004 |
| JP | 2005159447 A | * | 6/2005 |
| JP | 2005-191641 A | | 7/2005 |
| JP | 2006-345458 A | | 12/2006 |
| JP | 2008-092548 A | | 4/2008 |
| JP | 2010-141583 A | | 6/2010 |
| TW | 333116 B | | 11/2010 |
| TW | 333792 B | | 11/2010 |
| WO | 2008/153085 A1 | | 12/2008 |

* cited by examiner

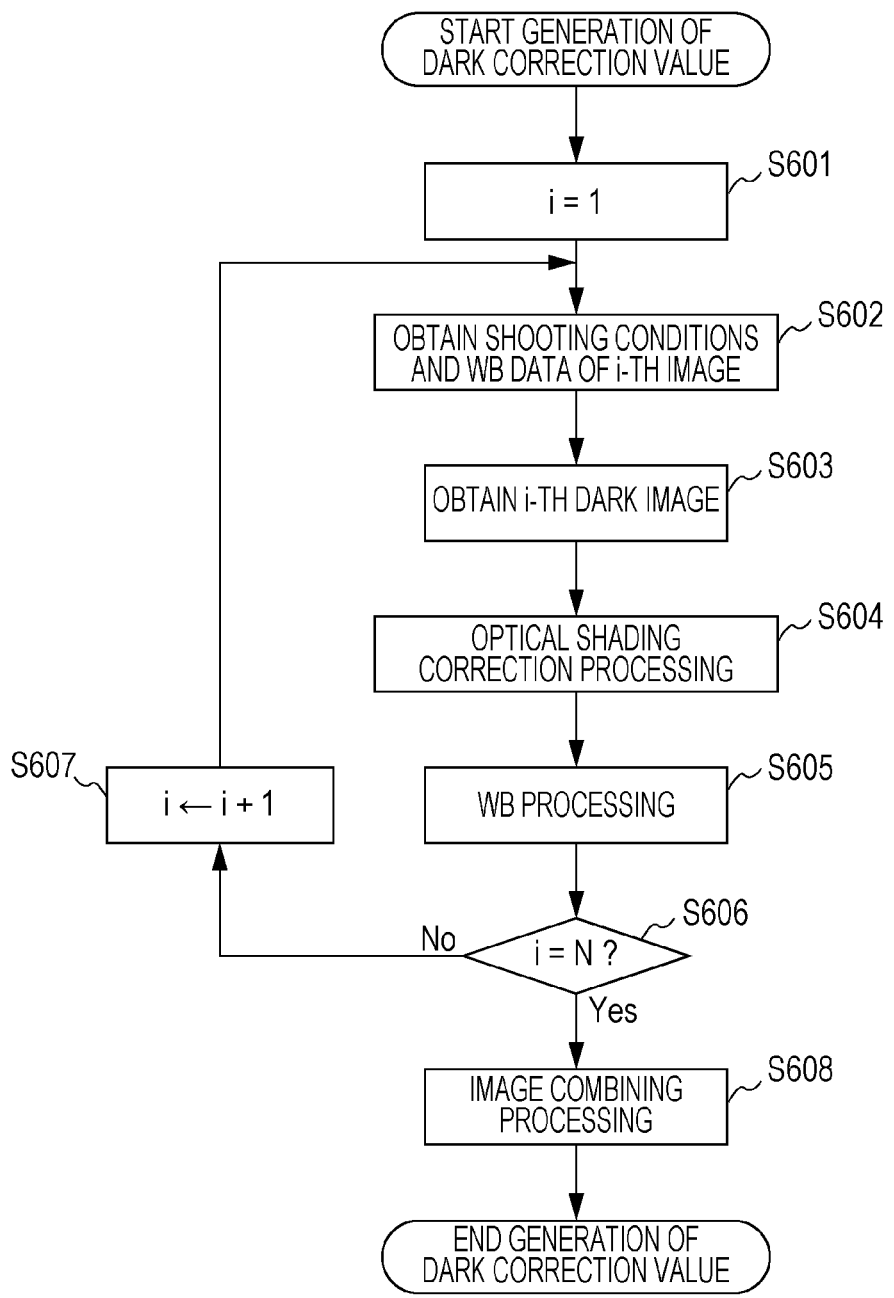

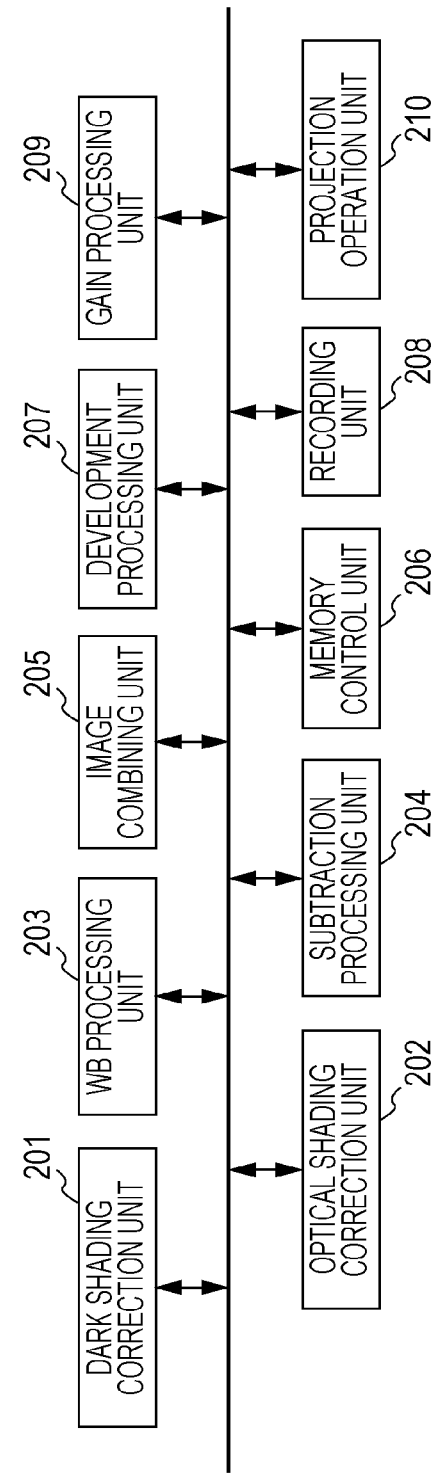

IMAGE CAPTURING APPARATUS AND METHOD FOR CONTROLLING AN IMAGE CAPTURING APPARATUS FOR CAPTURING AND PROCESSING A PLURALITY OF PIECES OF EXPOSURE AND DARK IMAGE DATA TO CORRECT COMBINED EXPOSURE IMAGE DATA IN ACCORDANCE WITH COMBINED DARK IMAGE DATA

TECHNICAL FIELD

An example of the present invention relates to an image capturing apparatus capable of performing multiple-exposure shooting, and a method for controlling the image capturing apparatus.

BACKGROUND ART

In image capturing apparatuses using image pickup elements, such as CMOS image sensors, fixed pattern noise arises from readout circuits of the image pickup elements. As a method for obtaining a high-quality image by reducing this fixed pattern noise, there is generally known a method for correcting fixed pattern noise by subtracting pre-stored data from image data. For example, PTL 1 discloses a method for correcting fixed pattern noise of an image by using pre-stored one-dimensional data, depending on shooting conditions.

CITATION LIST

Patent Literature

PTL 1: Japanese Patent Laid-Open No. 2003-333434

However, PTL 1 does not particularly mention a method for correcting characteristic fixed pattern noise of multiple-exposure shooting, in which an image capturing apparatus using an image pickup element, such as the above-described one, captures and adds a plurality of images so as to generate a combined image.

Accordingly, an example of the present invention aims to provide an image capturing apparatus capable of obtaining a high-quality multiple exposure image by reducing noise in multiple-exposure shooting.

SUMMARY OF INVENTION

For this end, in an example of the present invention, an image capturing apparatus includes an image pickup configured to capture an image of a subject and output image data; an image processor configured to perform image processing on image data output from the image pickup; a combiner configured to combine a plurality of pieces of image data; a corrector configured to correct the combined exposure image data; and a controller configured to perform control so that the image pickup performs image capturing with an image pickup element of the image pickup being exposed to light, thereby obtaining a plurality of pieces of exposure image data, the image processor performs image processing on the plurality of pieces of exposure image data, the combiner combines the plurality of pieces of exposure image data output from the image processor so as to generate combined exposure image data, the image pickup performs image capturing without the image pickup element being exposed to light, thereby obtaining a plurality of pieces of dark image data, the combiner generates one piece of dark reference image data by using the plurality of pieces of dark image data, the image processor performs, on the one piece of dark reference image data, image processing that uses a parameter based on a parameter of the image processing performed on each of the plurality of pieces of exposure image data, and outputs a plurality of pieces of processed dark image data corresponding to the plurality of pieces of exposure image data, the combiner combines the plurality of pieces of processed dark image data output from the image processor so as to generate combined dark image data, and the corrector corrects the combined exposure image data in accordance with the combined dark image data.

Also in an example of the present invention, a method for controlling an image capturing apparatus includes: a first image capturing step of performing image capturing with an image pickup element being exposed to light, thereby obtaining a plurality of pieces of exposure image data; a first image processing step of performing image processing on the plurality of pieces of exposure image data; a first combining step of combining the plurality of pieces of exposure image data so as to generate combined exposure image data; a second image capturing step of performing image capturing without the image pickup element being exposed to light, thereby obtaining a plurality of pieces of dark image data; a generation step of generating one piece of dark reference image data by using the plurality of pieces of dark image data; a second image processing step of performing, on the one piece of dark reference image data, image processing that uses a parameter based on a parameter of the first image processing performed on each of the plurality of pieces of exposure image data, and outputting a plurality of pieces of processed dark image data corresponding to the plurality of pieces of exposure image data; a second combining step of combining the plurality of pieces of processed dark image data so as to generate combined dark image data; and a correction step of correcting the combined exposure image data in accordance with the combined dark image data.

Further features of the present invention will become apparent from the following description of exemplary embodiments with reference to the attached drawings.

BRIEF DESCRIPTION OF DRAWINGS

FIG. 6A is a flowchart of image processing in the first embodiment.

FIG. 7 is a block diagram of a DSP used in a second embodiment.

DESCRIPTION OF EMBODIMENTS (First Embodiment)

A feature of this embodiment is that processing for reducing noise that arises from multiple-exposure shooting is performed during multiple-exposure shooting. In the case of performing multiple-exposure shooting in which a plurality of images are combined by addition, errors in correcting fixed pattern noise (such as vertical streaks, horizontal streaks, defects, and dark shading) that are equivalent to the number of added images may accumulate and become visible. For example, if errors in correction performed using one-dimensional horizontal data, such as that in PTL 1, accumulate, the errors appear in an image as horizontal-component dark shading or vertical streaks.

Accordingly, in this embodiment, dark images are obtained by performing shooting without light, separately from each exposure image obtained in main shooting of multiple-exposure shooting. The dark images having undergone image processing equivalent to that for the corresponding exposure image are combined into a combined dark image. Data of this combined dark image is subtracted from combined exposure image data that is obtained by combining the exposure images, whereby noise-reduced multiple exposure image data is obtained.

Figure 2:
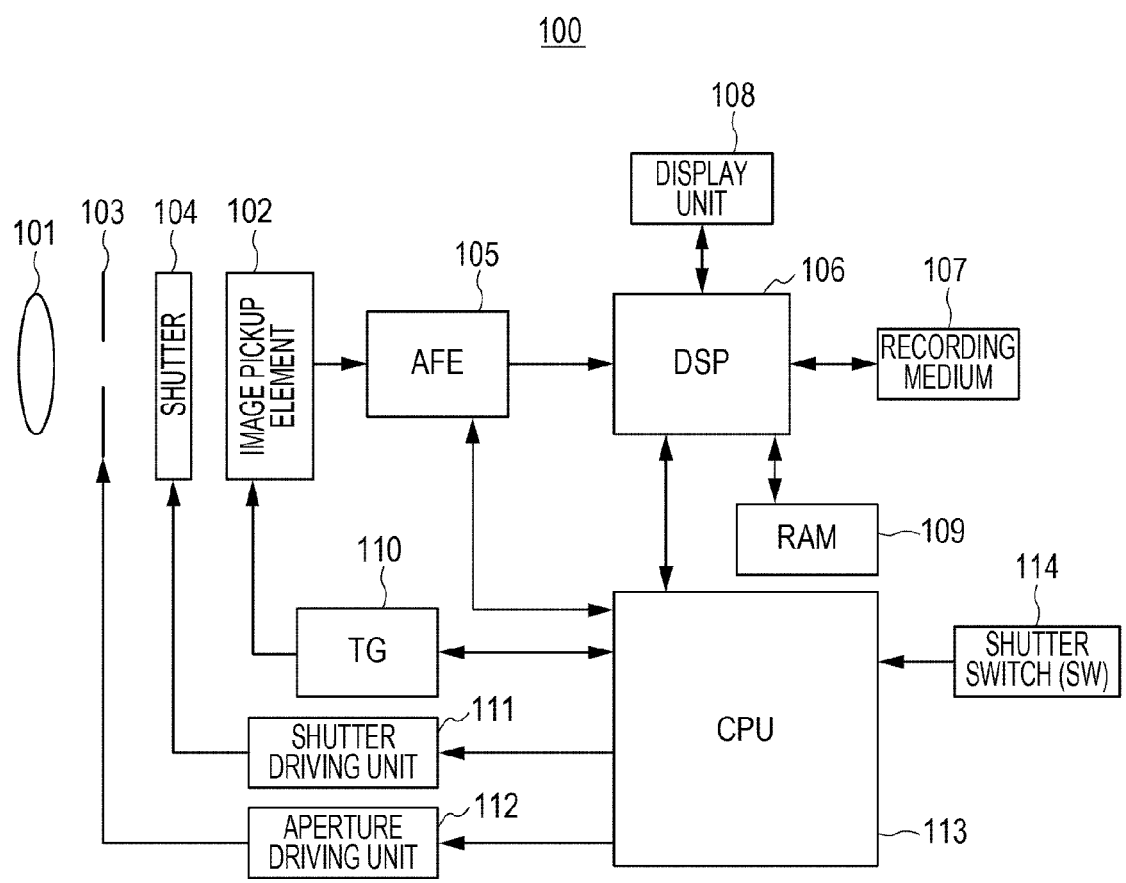
FIG. 2 is a diagram of an overall configuration of an image capturing apparatus in embodiments of the present invention.

Preferable embodiments of the present invention will be described in detail below on the basis of the attached drawings. FIG. 2 is a diagram illustrating an overall configuration of an image capturing apparatus 100 according to embodiments of the present invention.

An image of a subject formed by an image pickup lens 101 based on light coming from the subject is captured and undergoes photoelectrical conversion by an image pickup element 102. Although a Bayer-pattern CMOS image sensor is used as the image pickup element 102 in this embodiment, the image pickup element 102 is not limited to this type and may be a CMOS sensor with another pattern, a CCD image sensor, etc. An aperture 103 and a mechanical shutter 104 are disposed between the image pickup lens 101 and the image pickup element 102 in a shooting light path, and adjust the amount of light led to the image pickup element 102.

An analog image signal output from the image pickup element 102 is converted into a digital signal by an AFE (Analog Front End) 105. A DSP (Digital Signal Processor) 106 performs various kinds of image processing on the digital image signal output from the AFE 105.

A recording medium 107 stores image data thereon. A display unit 108 displays captured images, various menu screens, etc. As the display unit 108, a liquid crystal display (LCD) or the like is used. A RAM 109 is connected to the DSP 106, and temporarily stores image data, etc.

A TG (Timing Generator) 110 supplies a driving signal to the image pickup element 102. A shutter driving unit 111 drives the mechanical shutter 104. An aperture driving unit 112 drives the aperture 103. A CPU 113 controls the AFE 105, the DSP 106, the TG 110, the shutter driving unit 111, the aperture driving unit 112, and other units.

A shutter switch (SW) 114 supplies a shooting instruction to the CPU 113 in response to an operation of a photographer.

Figure 3:
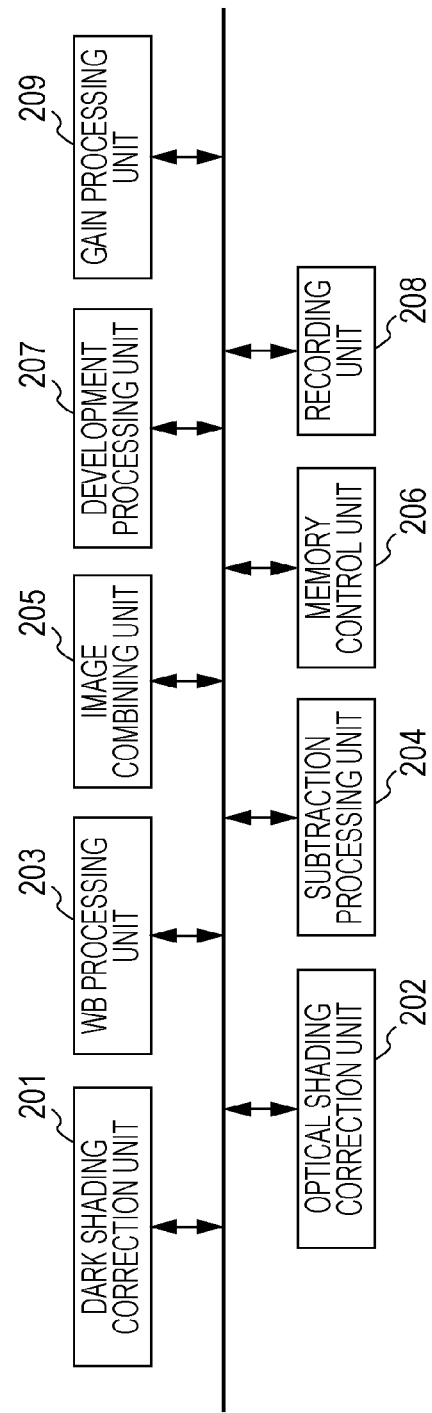
FIG. 3 is a block diagram of a DSP used in a first embodiment.

FIG. 3 is a diagram illustrating an internal block configuration of the DSP 106. A dark shading correction unit 201 subtracts correction values, i.e., horizontal one-dimensional data, from an image, thereby correcting horizontal dark shading. An optical shading correction unit 202 performs gain correction based on a horizontal or vertical position (coordinates) in the image, thereby correcting optical shading. A WB (white balance) processing unit 203 multiples each of R, G1, G2, and B pixels of the Bayer pattern by a gain, thereby performing white balance processing. A subtraction processing unit 204 performs processing of subtracting a dark image from an exposed image as described later.

An image combining unit 205 performs an image combining operation in multiple-exposure shooting. In this embodiment, it is assumed that the image combining unit 205 combines a set number of images by addition, thereby generating a multiple exposure image. A memory control unit 206 controls reading and writing of image data and correction values used in each correction block from and to the RAM 109, respectively. A development processing unit 207 performs development processing, such as color matrix processing and gamma processing, on image data. A recording unit 208 writes the image data having undergone the development process on the recording medium 107.

In addition, a gain processing unit 209 is capable of multiplying image data by a given gain.

Figure 1:
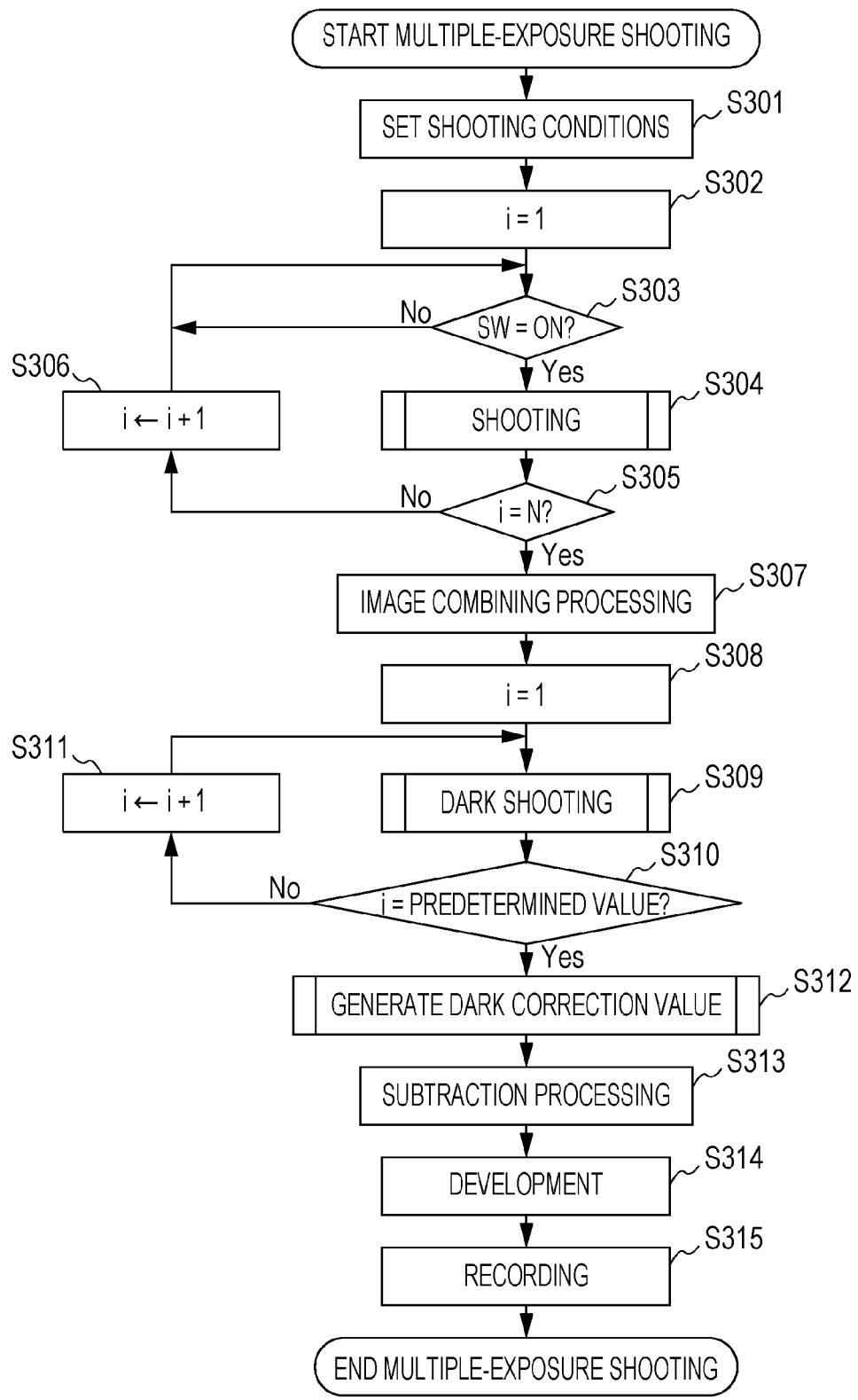
FIG. 1 is a flowchart of a multiple-exposure shooting operation in embodiments of the present invention.

FIG. 1 is a flowchart illustrating an operation sequence of an image capturing apparatus in multiple-exposure shooting.

First, in step S301, various shooting conditions including the number of images to be combined in multiple-exposure shooting, WB, AE, and an ISO speed are set through an operation of a photographer. The number of to-be-combined images may be set automatically in accordance with the scene determination or mode. Assume here that the set number of to-be-combined images is denoted by N. In subsequent step S302, the value of a variable i which manages the number of images having been captured in multiple-exposure shooting is cleared to '1'. Next, in step S303, turning on of the shutter switch 114 (SW) in response to a shooting instruction operation of the photographer is waited for. Once the shutter switch 114 (SW) being turned on, a shooting operation is performed in step S304, and one image is captured. Details of the shooting operation will be described later. Thereafter, in step S305, it is determined whether the shooting operation is the last (N-th) shooting of the multiple-exposure shooting. When the variable i is less than N, the shooting has not reached the N-th shooting. Thus, the value of the variable i is incremented in step S306. The process then returns to step S303, in which a next shooting instruction is waited for (steps S304 to S306: a first image capturing step). In the case of the N-th shooting in step S305, the process proceeds to step S307, in which the image combining unit 205 performs image combining processing for adding the N captured images (a first combining step).

After the image combining processing is finished, the variable i is cleared again to '1' for dark shooting in step S308. Subsequently, in step S309, dark shooting is performed. Details of the dark shooting will be described later. In this embodiment, the number of images captured in dark shooting is equal to N as in shooting of exposure images. In step S310, the value of the variable i is checked. If the variable i is less than the number of images captured in multiple-exposure shooting, i.e., N, the variable i is incremented in step S311. The process returns to step S309, and shooting is repeated until N dark images are captured (steps S309 to S311: a second image capturing step).

After the dark shooting is repeated N times, dark correction values are generated by using the N dark images in step S312. Details of generation of the dark correction values will be described later. In step S313, the subtraction processing unit 204 subtracts the dark correction values generated in step S312 from the image generated in step S307, thereby performing offset correction. Through this correction, fixed pattern noise is reduced.

In step S314, the development processing unit 207 performs development processing, such as color matrix processing and gamma processing, on the image data having undergone the subtraction processing. Thereafter, the recording unit 208 stores the image data on the recording medium 107 in step S315. The multiple-exposure shooting operation then ends.

Figure 4:
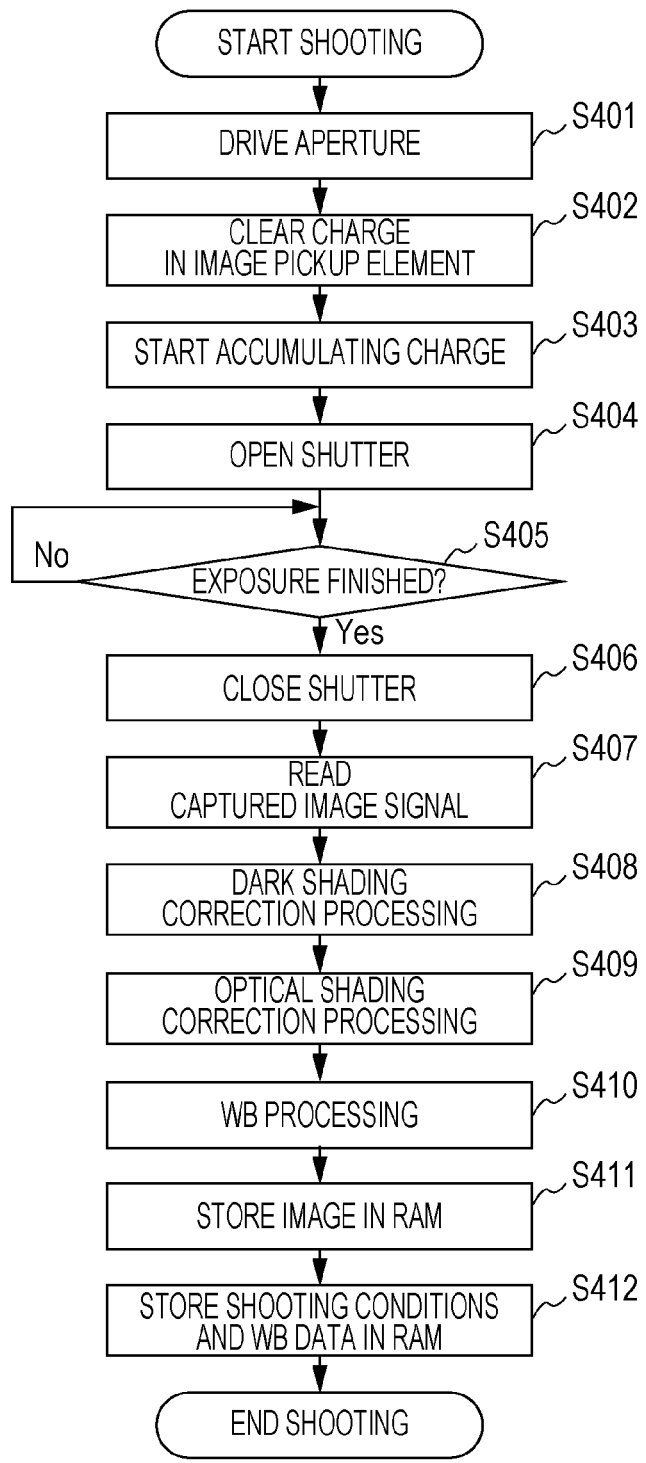
FIG. 4 is a flowchart of a shooting operation in embodiments of the present invention.

Next, the details of the shooting operation of step S304 will be described using a flowchart illustrated in FIG. 4.

After the shooting operation is started, aperture driving is performed in step S401. In the aperture driving, the CPU 113 drives the aperture 103 via the aperture driving circuit 112. Next, in step S402, charge in the image pickup element 102 is cleared. This operation is performed by the TG 110 by driving the image pickup element 102 in accordance with an instruction from the CPU 113. Upon charge being cleared, the image pickup element 102 enters a charge accumulating state (step S403).

With the image pickup element 102 being in the charge accumulation state, the CPU 113 brings the mechanical shutter 104 to an open state via the shutter driving circuit 111, and starts exposure of the image pickup element 102 in step S404. The CPU 113 waits until a predetermined time passes in step S405, and then brings the mechanical shutter 104 to a closed state via the shutter driving circuit 111, and finishes exposure of the image pickup element 102.

Thereafter, the CPU 113 drives the TG 110, thereby reading out a captured image signal from the image pickup element 102 in step S407. In step S408, the dark shading correction unit 201 performs dark shading correction on the read captured image signal. It is assumed that horizontal dark shading is corrected by subtracting horizontal one-dimensional data that is obtained by performing a projection operation on a dark image in advance. Subsequently in step S409, the optical shading correction unit 202 performs gain correction on the signal of each pixel in accordance with the coordinate position, thereby correcting optical shading. At this time, a value based on the shooting conditions under which the image to be corrected was captured is used as the correction parameter. The shooting conditions indicate the zoom position of the lens, the type of the image pickup lens, the aperture, the shutter speed, the ISO speed, the temperature, etc.

Next in step S410, WB processing for multiplying each of R, G1, G2, and B pixels of the Bayer pattern by a gain is performed on the optical-shading-corrected image data. Here, as each gain, a value calculated from the image data of the image of interest or a preset value is used (steps S409 to S410: a first image processing step).

The WB-processed image data is stored in the RAM 109 via the memory control unit 206 in step S411. Further, in step S412, the above-described shooting conditions and WB data (gains) are stored in the RAM 109 also via the memory control unit 206. The shooting operation then ends.

Figure 5:
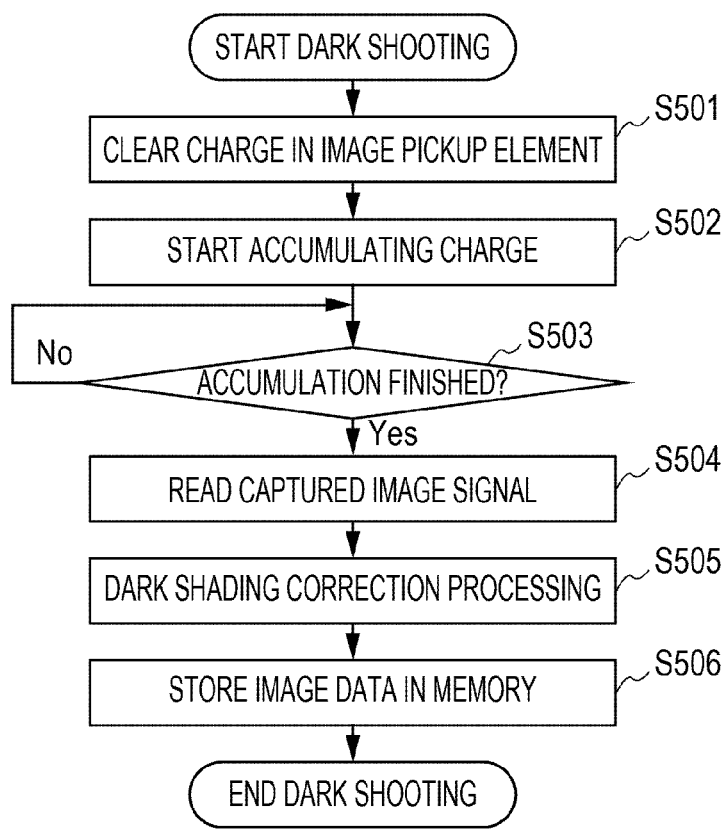
FIG. 5 is a flowchart of a dark shooting operation in embodiments of the present invention.

Next, the details of the dark shooting operation will be described using the flowchart illustrated in FIG. 5. In dark shooting, shooting is performed without driving the mechanical shutter 104 so that the image pickup element 102 is not exposed to light.

First in step S501, charge in the image pickup element 102 is cleared as in step S402 described above, and the image pickup element 102 enters the charge accumulating state (step S502).

Next, elapse of a predetermined accumulation period is waited for (step S503). Then in step S504, a captured image signal in the image pickup element 102 is read out. Dark shading correction is performed on the read out captured image signal as in step S408. The corrected image data is stored in the RAM 109 in step S506. The dark shooting operation then ends.

After the dark shooting is performed the predetermined number of times (N times) so that as many dark images as the number of exposure images resulting from main shooting are obtained, dark correction values are generated in step S312. The details of this generation of dark correction values will be described using a flowchart of FIG. 6A.

In step S601, a variable i for counting the number of processed dark images is cleared to '1'.

In step S602, the shooting conditions and WB data for the i-th exposure image captured in step S304 are obtained from the RAM 109. These pieces of data have been stored in the RAM 109 in step S412. In step S603, the i-th dark image data captured in step S309 is obtained from the RAM 109 via the memory control unit 206. In step S604, optical shading correction processing is performed on the obtained i-th dark image. At this time, a parameter based on the shooting conditions read out in step S602 is used as the correction parameter. In this embodiment, the same correction parameter as that for the i-th image captured in step S304 is used. However, the parameter is not limited to this one and may be appropriately changed. However, the correction parameter is preferably similar to that for the i-th image captured in step S304. After the optical shading correction processing is finished, WB processing is performed in step S605 (steps S602 to S605: a second image processing step). In this case, as a gain (WB data) to be multiplied by each pixel of the Bayer pattern, a gain based on the shooting conditions read out in step S602 is used. In this embodiment, the same gain as that for the i-th image captured in step S304 is used. However, the gain is not limited to this one and may be appropriately changed. In step S606, the value of the variable i is checked. If the value has not reached N, i.e., the number of images of multiple shooting, the value is incremented in step S607. Then, the process returns to step S602, in which the similar processing is performed on the next dark image. In this manner, N dark images are generated on which the correction and WB processing have been performed using the same parameters as those for the N corresponding exposure images captured in step S304.

In step S608, the image combining unit 205 performs combining processing for adding the N dark images, thereby generating combined dark image data.

Figure 6B:
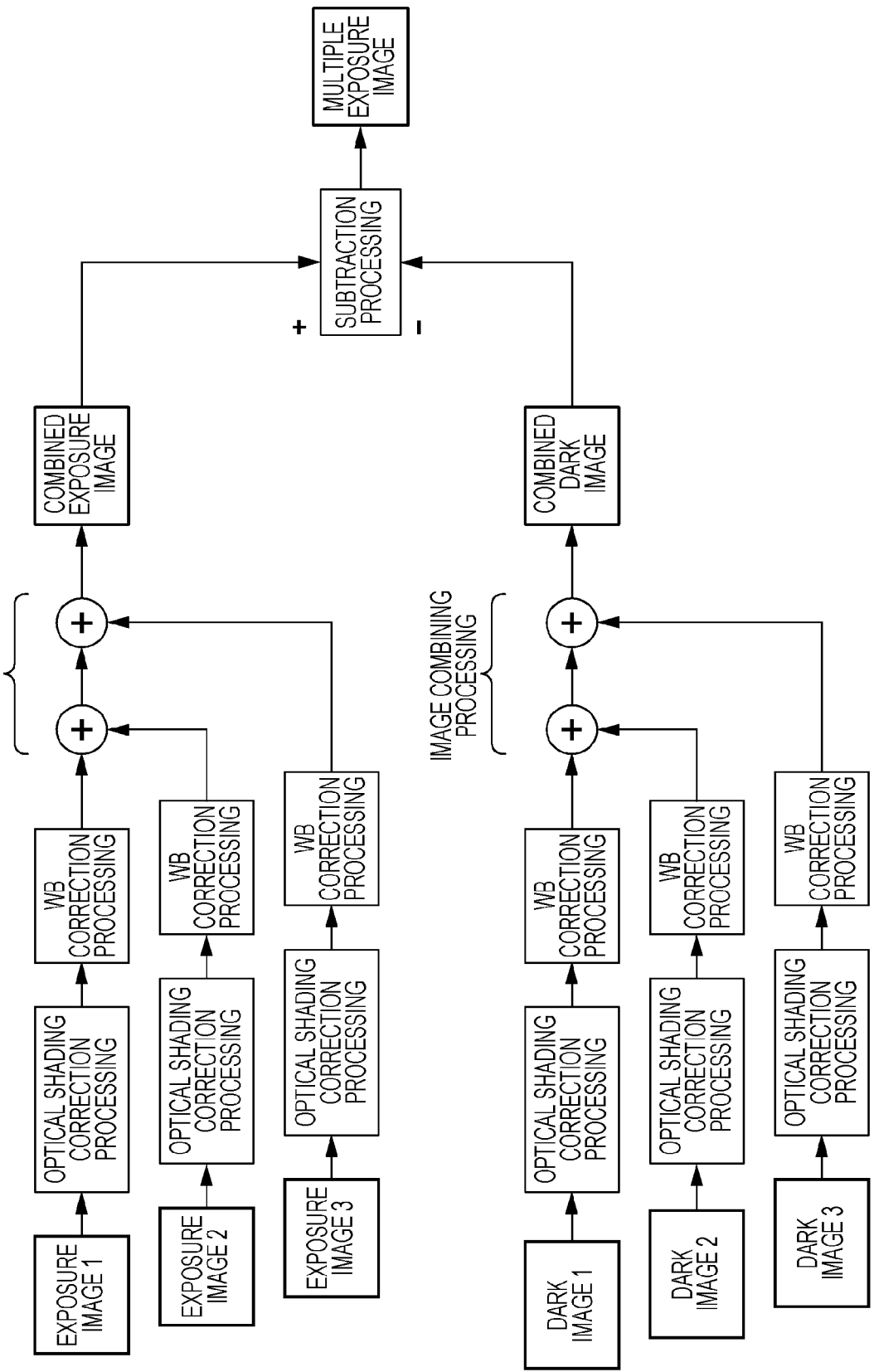
FIG. 6B is a diagram of the flow of the image processing in the first embodiment.

FIG. 6B illustrates a processing sequence performed on images in this embodiment. A thick frame represents image data. An example is illustrated assuming that the number of images of multiple shooting N is 3. Each of exposure images 1 to 3 and dark images 1 to 3 is illustrated as an image on which the dark shading correction processing has been performed. The optical shading correction processing and the WB correction processing in FIG. 6B are performed in the optical shading correction unit 202 and the WB processing unit 203, respectively. In addition, the subtraction processing is performed in the subtraction processing unit 204.

As described above, in this embodiment, dark images are captured separately from each exposure image captured in multiple-exposure shooting. Images are generated which correspond to the exposure images and on which image processing equivalent to that for the corresponding exposure images has been performed. Combined dark image data obtained by combining those images is subtracted from combined exposure image data obtained by combining the exposure images resulting from main shooting.

Through this processing sequence, fixed pattern noise (such as vertical streaks, horizontal streaks, defects, and shading) that worsens due to combining images in multiple-exposure shooting may be reduced by correction and a high-quality multiple exposure image may be obtained.

Only the same number of dark images as the number of images of multiple shooting, i.e., N, is needed. When N is small, only a short period of time is needed for dark shooting and the operability for a photographer is not reduced significantly. In addition, regarding the calculation processing time and the memory usage (of the RAM 109) during the calculation, combining dark images only requires substantially the same period of time and substantially the same memory usage as those for exposure-image combining processing.

To prevent overcorrection, the subtraction processing may be performed on the combined exposure image after the dark correction values are multiplied by a correction coefficient k (k is equal to 1 or less). When this is performed, it may be configured that the correction coefficient k is multiplied in the gain processing unit 209 after the image combining processing of step S608.

Furthermore, the accumulation period in dark shooting may be different from that for exposure images. The shorter the accumulation period, the further the time for dark shooting may be shortened and the further the operability for the photographer may be improved.

Conversely, the accumulation period in dark shooting may be equal to that for exposure images. In that case, noise due to dark current of the image pickup element 102 may be also corrected and reduced.

In addition, the description has been given assuming that the same number of images (N) is combined in combining dark images and in combining exposure images. However, the number of images to be combined may differ between exposure images and dark images. For example, when some of exposure images to be combined have already undergone correction processing using a method similar to the present invention, correction of those images is unnecessary and corresponding dark images may be omitted in the dark image combining processing.

(Second Embodiment)

In the first embodiment, the S/N ratio of the corrected multiple exposure image may decrease because of the influence of random noise (noise with a noise signal level that randomly fluctuates over time) of each pixel. Accordingly, a feature of a second embodiment is that projection operation processing is performed on an obtained dark image, whereby the influence of random noise is reduced and the decrease in the S/N ratio is prevented.

The second embodiment differs from the first embodiment in the internal blocks of the DSP 106 and the processing of generating dark correction values. FIG. 7 is a diagram illustrating an internal block configuration of the DSP 106 according to this embodiment. A projection operation unit 210 averages image data, in which pixel signals are arranged in a matrix form, in the vertical direction on a column-by-column basis, thereby creating projection data for one line.

Figure 8A:
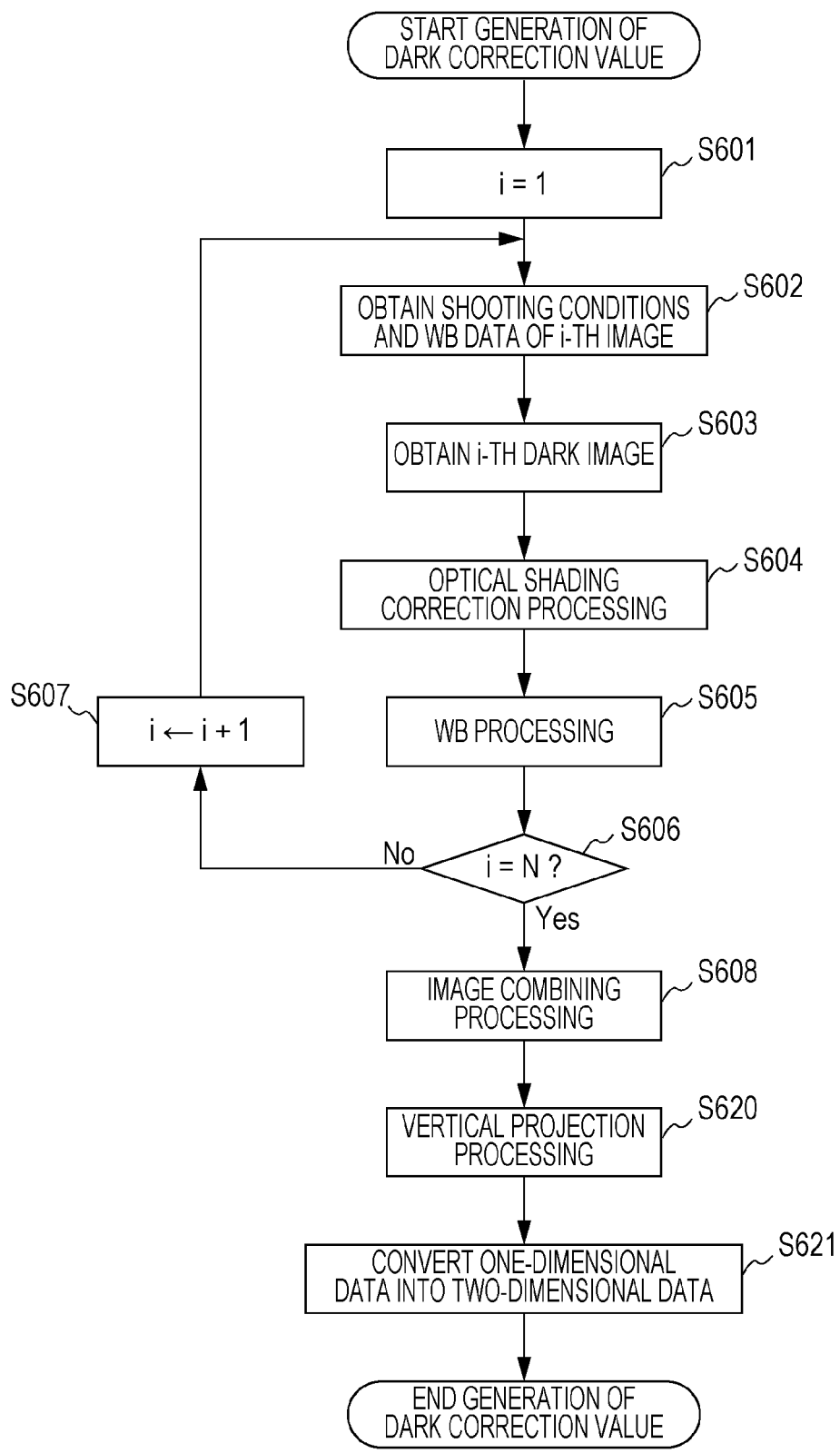
FIG. 8A is a flowchart of image processing in the second embodiment.
Figure 8B:
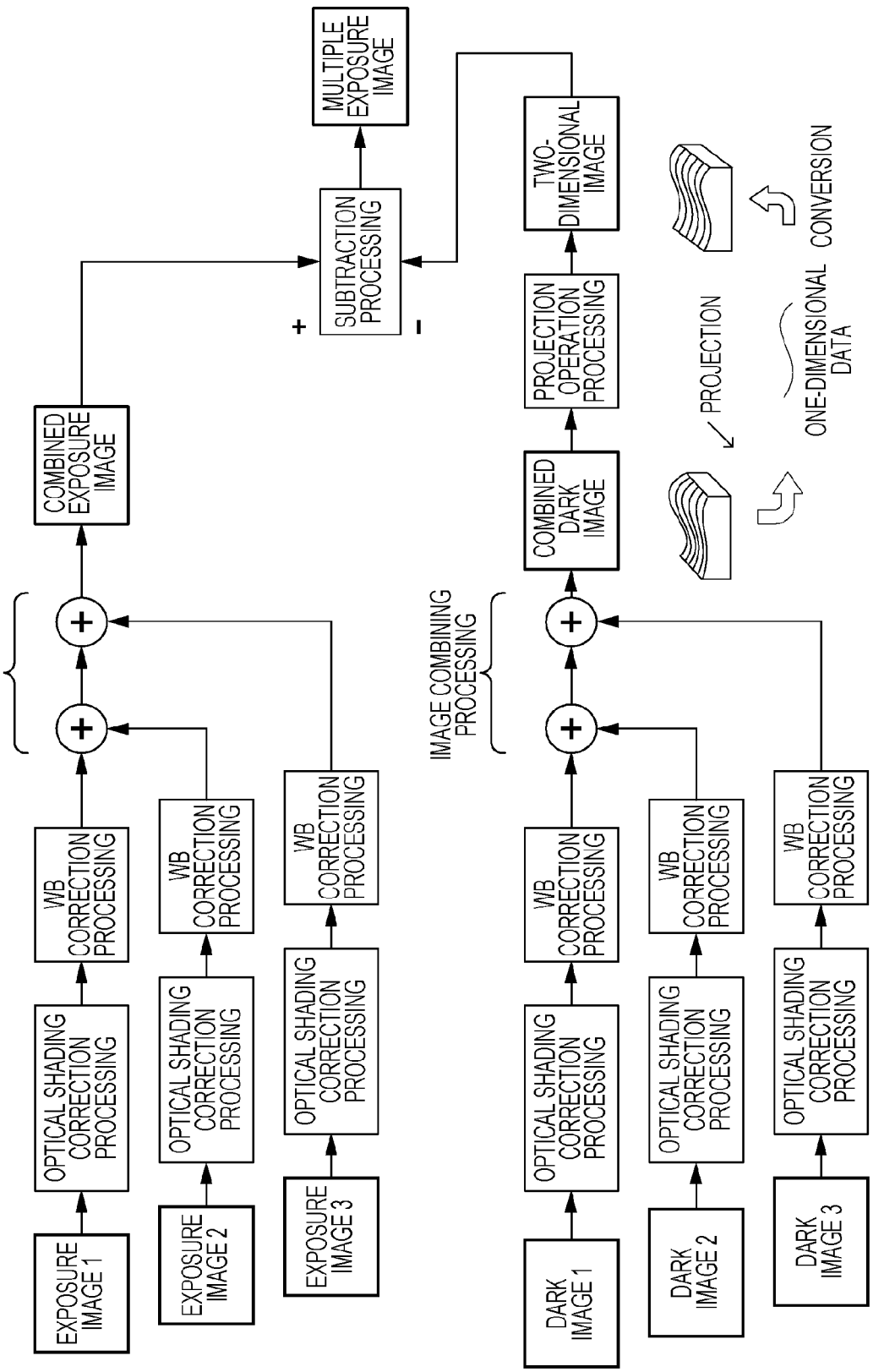
FIG. 8B is a diagram of the flow of the image processing in the second embodiment.

FIG. 8A is a flowchart illustrating details of the generation of dark correction values of step S312 in this embodiment. The projection operation unit 210 performs projection operation processing on combined dark image data generated in step S608, thereby temporarily converting the image data into projection data for one line (step S620). Next in step S621, the one-dimensional data is copied as many times as the number of lines of an image, whereby the one-dimensional data is converted into two-dimensional data. The generation of dark correction values then ends. FIG. 8B illustrates a processing sequence performed on images in this embodiment.

In this embodiment, since the average of each column is calculated in the projection operation processing of step S620, the influence of random noise may be reduced and the decrease in the S/N ratio of the image of multiple-exposure shooting may be suppressed.

As described above, in this embodiment, dark images are captured separately from exposure images captured in multiple-exposure shooting. A reference image is generated by performing a projection operation on an added image of the dark images. On the basis of the generated reference image, images are generated which correspond to the exposure images and have undergone image processing equivalent to that for the corresponding exposure images. Combined dark image data obtained by combining those images is subtracted from combined exposure image data obtained by combining the exposure images resulting from main shooting. In this manner, deteriorations such as vertical streaks and horizontal dark shading in multiple-exposure shooting may be reduced. However, unlike the first embodiment, noise components that fluctuate in the vertical direction, such as defects and horizontal streaks, are not to be reduced.

Although the projection operation processing of step S620 is projection in the vertical direction herein, this may be projection in the horizontal direction obviously. In this case, noise components that can be reduced are horizontal streaks and vertical dark shading.

Also in this embodiment, to prevent overcorrection, the subtraction processing may be performed on the combined exposure image after the dark correction values are multiplied by a correction coefficient k (k is equal to 1 or less). When this is performed, it may be configured that the correction coefficient k is multiplied in the gain processing unit 209 after the image combining processing of step S608.

In addition, in this embodiment, the projection operation processing of step S620 is applied to the combined dark image data obtained by addition. However, the configuration is not limited this one, and the projection operation processing may be performed on each dark image data after the WB processing of step S605 or each dark image data before the optical shading correction processing of step S604. In these cases, the image combining processing is performed in step S608 such that the dark image data having been converted into one-dimensional data (one-dimensional image data) is arranged as many times as the number of lines of one screen so as to form dark image data for one screen. Since these methods require the projection operation processing as many times as the number of captured images, the operation load increases. However, particularly when the projection operation processing is performed prior to the optical shading correction processing, the projection operation processing does not damage vertical correction components of the optical shading correction processing. Thus, dark images having undergone image processing equivalent to that for exposure images may be generated.

For example, the accumulation period in dark shooting may be different from that for exposure images. The shorter the accumulation period, the further the time for dark shooting may be shortened and the further the operability for a photographer may be improved.

Conversely, the accumulation period in dark shooting may be equal to that for exposure images. In that case, noise due to dark current of the image pickup element 102 may be also corrected and reduced.

In addition, the description has been given assuming that the number of images captured and combined in dark shooting is the same as the number of combined exposure images (N). However, the numbers of images are not necessary the same. For example, when correction processing has already been performed on some of exposure images to be combined using a method similar to the present invention, correction for those images is unnecessary and corresponding dark images may be omitted in dark image shooting and combining processing.

(Third Embodiment)

In the first embodiment, the S/N ratio of the corrected multiple exposure image may decrease because of the influence of random noise (noise with a noise signal level that randomly fluctuates over time) of each pixel. Accordingly, a feature of a third embodiment is that M dark images are obtained separately from (N) exposure images captured in main shooting and those dark images are combined by addition into a dark reference image, whereby the influence of random noise is reduced and the decrease in the S/N ratio is prevented.

Note that the configuration of the entire image capturing apparatus and the internal blocks of the DSP 106 are the same as those of the first embodiment illustrated in FIGS. 2 and 3, respectively. In the third embodiment, the predetermined value of step S310 is set equal to M, which is independent from the number of exposure images (N) captured in main shooting in the operation sequence of an image capturing apparatus illustrated in FIG. 1.

Figure 9A:
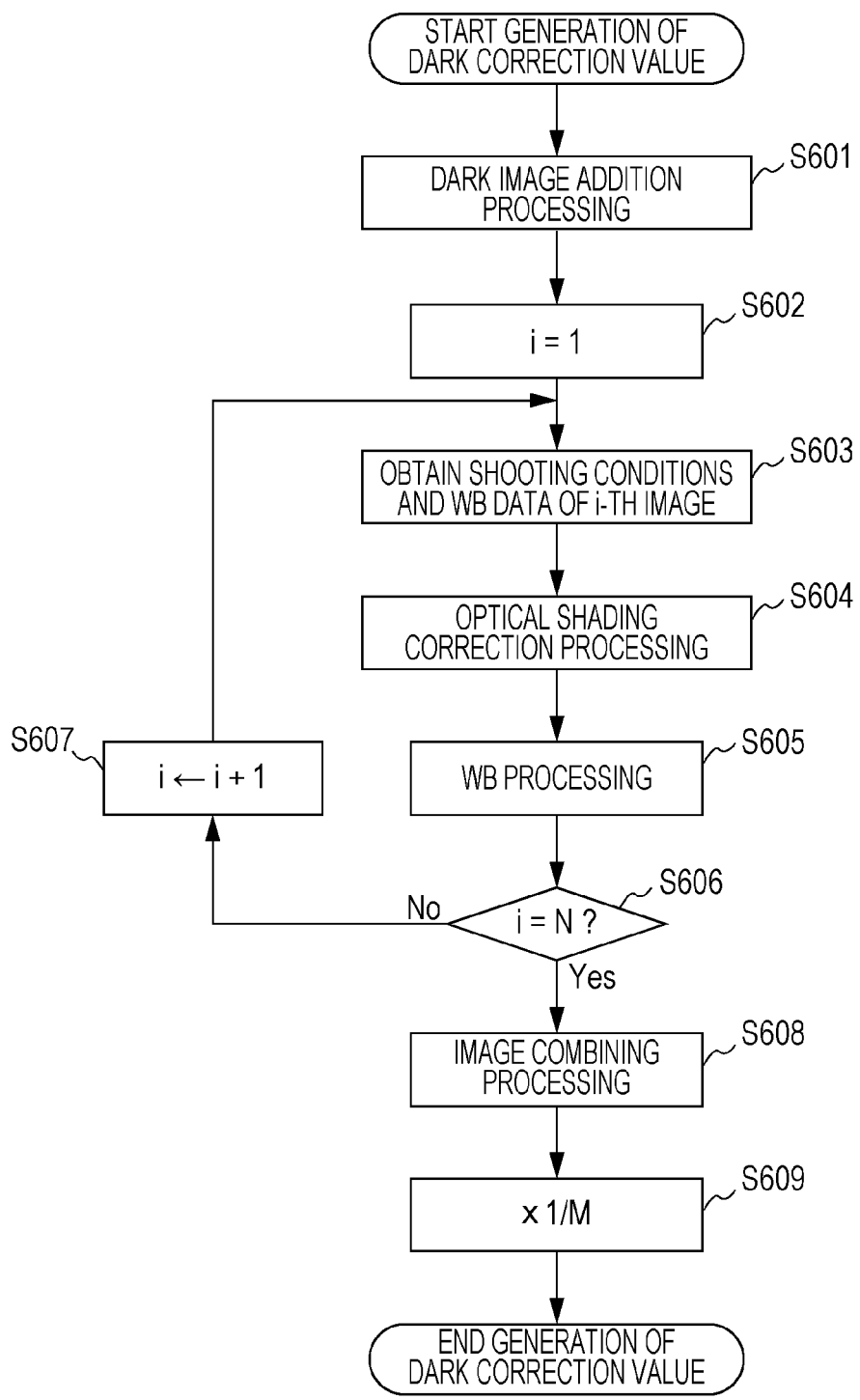
FIG. 9A is a flowchart of image processing in a third embodiment.

In addition, the processing of generating dark correction values of step S312 is different from that of the first embodiment, and a flowchart thereof is illustrated in FIG. 9A.

First, in step S601, M images captured in dark shooting are added in the image combining unit 205, whereby a dark reference image is generated. In step S602, a variable i for counting the number of times processing is performed on the dark reference image generated in step S601 is cleared to '1'.

In step S603, the shooting conditions and WB data for an i-th image captured in step S304 is obtained from the RAM 109. These pieces of data have been stored in the RAM 109 in step S412. In step S604, the optical shading correction processing is performed on the dark reference image. At this time, a parameter based on the shooting conditions read out in step S603 is used as the correction parameter. In this embodiment, the same correction parameter as that for the i-th image captured in step S304 is used. However, the parameter is not limited to this one and may be appropriately changed. However, the correction parameter is preferably similar to that for the i-th image captured in step S304. After the optical shading correction processing is finished, the WB processing is performed in step S605 (steps S602 to S605: a second image processing step). In this case, a gain based on the shooting conditions read out in step S603 is used as a gain (WB data) to be multiplied by each pixel of the Bayer pattern. In this embodiment, the same gain as that for the i-th image captured in step S304 is used. However, the gain is not limited to this one and may be appropriately changed. In step S606, the value of the variable i is checked. If the value has not reached N, i.e., the number of images of multiple shooting, the value is incremented in step S607. Then, the process returns to step S603, in which the similar processing is repeated again on the dark reference image generated in step S601. In this way, N dark images are generated on which the correction and WB processing have been performed using the same parameters as those for the N corresponding exposure images captured in step S304.

In step S608, the N dark images are added in the image combining unit 205, whereby combining processing is performed. In subsequent step S609, the image data having undergone the combining processing is multiplied by 1/M in the gain processing unit 209, whereby the dark correction values are generated.

Here, processing of steps S603 to S608 is performed on the dark reference image data obtained by adding the M images and then the result is divided by M, whereby the operation accuracy of S603 to S608 may be substantially increased and correction accuracy of the image of multiple-exposure shooting may be increased.

Figure 9B:
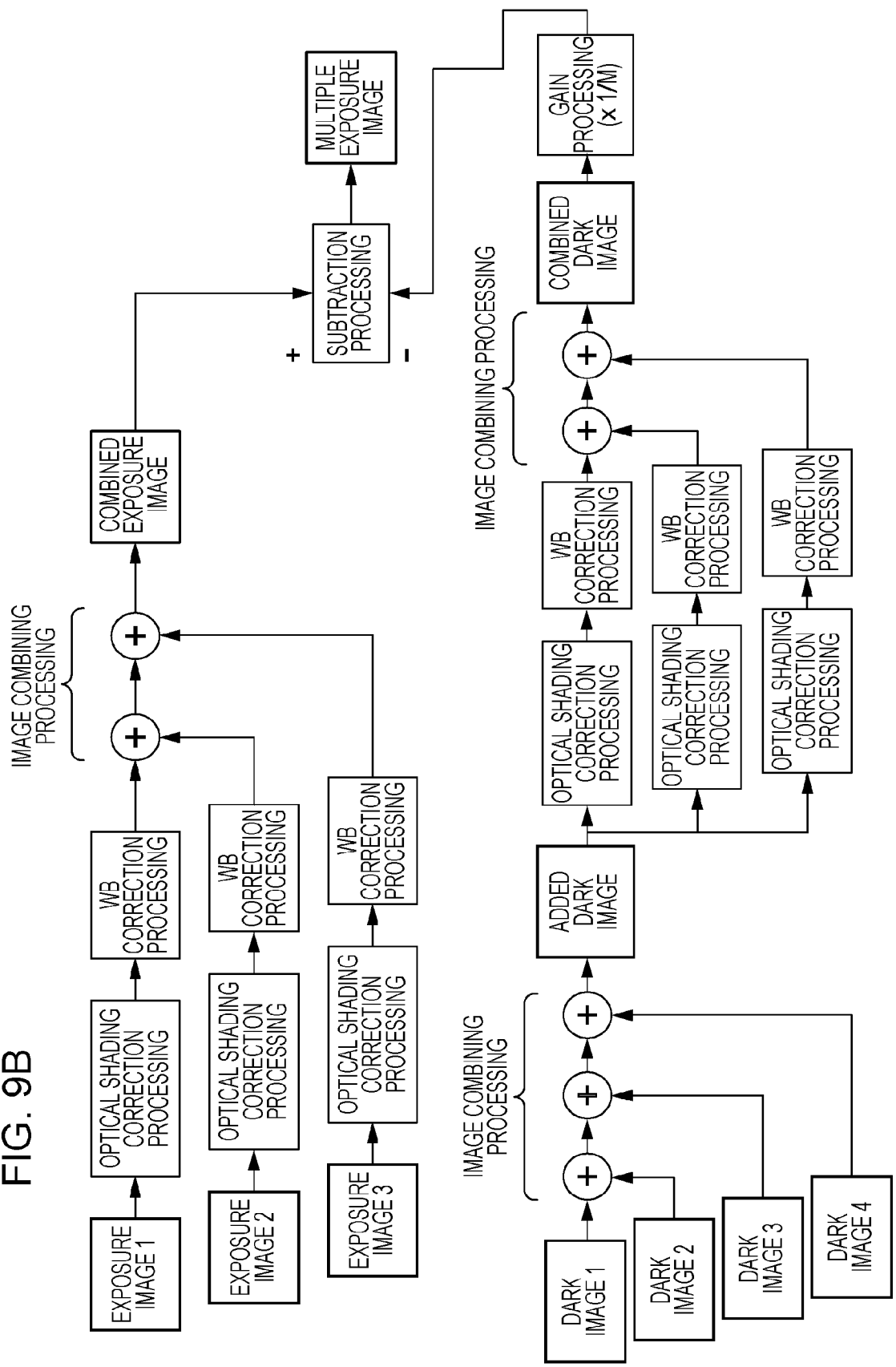
FIG. 9B is a diagram of the flow of the image processing in the third embodiment.

FIG. 9B illustrates a processing sequence performed on images in this embodiment. A thick frame represents image data. An example is illustrated assuming that the number of images of multiple shooting N is 3 and the number of images of dark shooting M is 4. Each of exposure images 1 to 3 and dark images 1 to 4 is illustrated as an image on which the dark shading correction processing has been performed. The optical shading correction processing and the WB correction processing are performed in the optical shading correction unit 202 and the WB processing unit 203, respectively. In addition, the subtraction processing is performed in the subtraction processing unit 204.

As described above, in this embodiment, dark images are captured separately from exposure images captured in multiple-exposure shooting. A reference image is generated by adding the dark images. On the basis of the generated reference image, images are generated which correspond to the exposure images and on which image processing equivalent to that for the corresponding exposure images has been performed. Combined dark image data obtained by combining those images is subtracted from combined exposure image data obtained by combining the exposure images resulting from main shooting. In this manner, fixed pattern noise (such as vertical streaks, horizontal streaks, defects, and shading) that worsens due to combining images in multiple-exposure shooting may be reduced by correction and a high-quality multiple exposure image may be obtained.

In this embodiment, image correction such as optical shading correction and WB processing is performed after M dark images are added, and then the result is divided by M, whereby the influence of random noise may be reduced and the correction data may be also calculated accurately. The larger the number of images of dark shooting, the larger the effect of reducing the influence of random noise and the higher the accuracy of calculating correction data.

The larger 'M', which represents the number of added dark images, is more desirable since the random noise reduction effect and the calculation accuracy improvement effect may be obtained. However, this embodiment may be performed by setting M to 1. When M is small, the time for dark shooting is short. Thus, the waiting time of a photographer may be shortened and the operability may be improved.

Furthermore, the accumulation period in dark shooting may be different from that for exposure images. The shorter the accumulation period, the further the time for dark shooting may be shortened and the further the operability for the photographer may be improved.

Conversely, the accumulation period in dark shooting may be equal to that for exposure images. In that case, noise due to dark current of the image pickup element 102 may be also corrected and reduced.

In addition, the description has been given assuming that the same number of images (N) is combined in combining dark images and in combining exposure images. However, the number of images to be combined may differ between exposure images and dark images. For example, when some of exposure images to be combined have already undergone correction processing using a method similar to the present invention, correction of those images is unnecessary and corresponding dark images may be omitted in the dark image combining processing.

(Fourth Embodiment)

Since the influence of random noise of each pixel is not completely removed when the number of images of dark shooting M is small, the S/N ratio of the corrected multiple exposure image may not be improved sufficiently in the third embodiment. Accordingly, a feature of a fourth embodiment is that projection operation processing is performed on an obtained dark reference image in addition to the processing performed in the third embodiment, whereby the influence of random noise is reduced and the decrease in the S/N ratio is prevented.

Note that the configuration of the entire image capturing apparatus is the same as that of the first embodiment illustrated in FIG. 2, and the internal blocks of the DSP 106 are the same as that of the second embodiment illustrated in FIG. 7. In the fourth embodiment, the predetermined value of step S310 is set equal to M, which is independent from the number of exposure images (N) captured in main shooting in the operation sequence of an image capturing apparatus illustrated in FIG. 1.

Figure 10A:
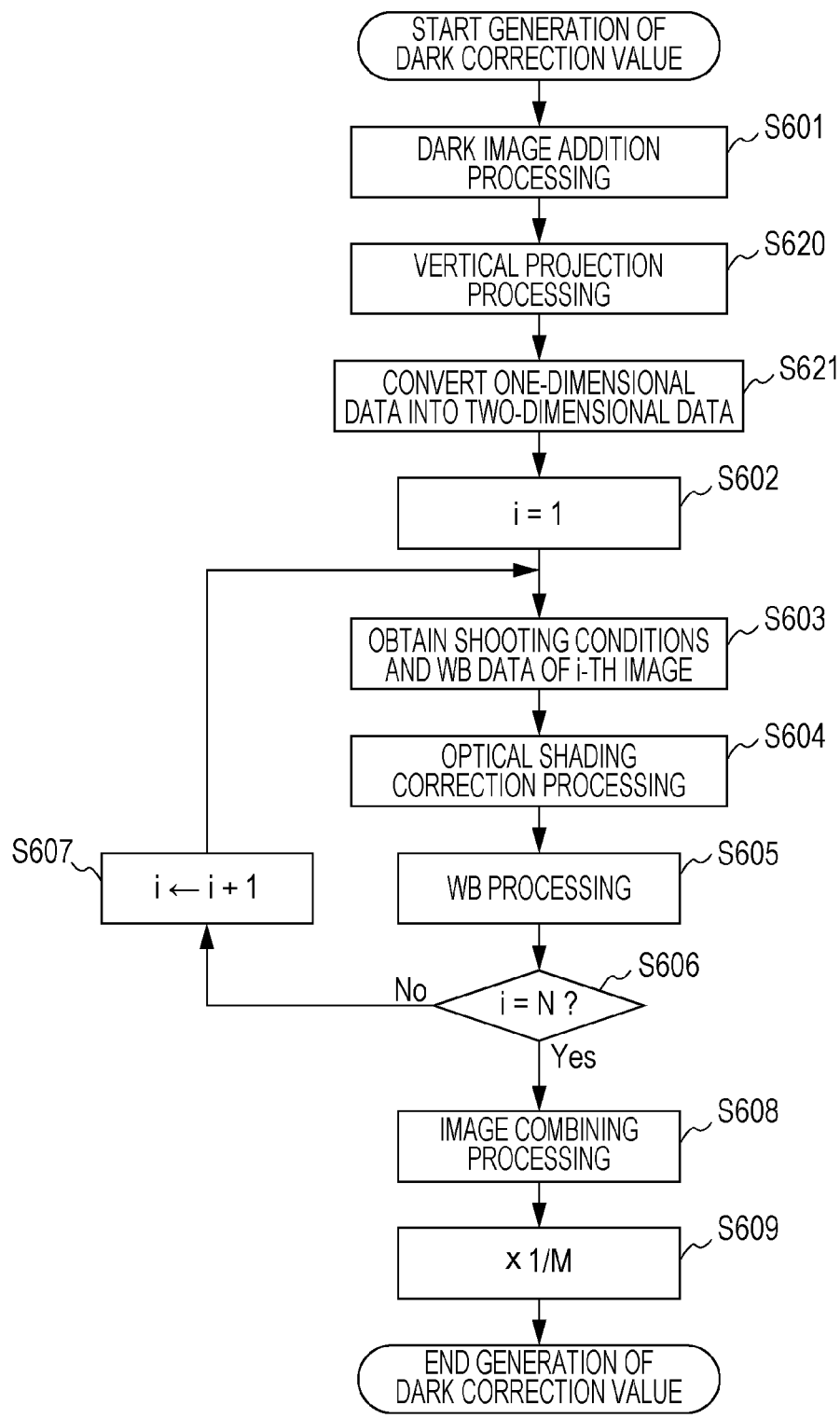
FIG. 10A is a flowchart of image processing in a fourth embodiment.

In addition, the processing of generating dark correction values of step S312 is different from that of the first embodiment, and a flowchart thereof is illustrated in FIG. 10A.

The projection operation unit 210 performs projection operation processing on an added dark image generated in step S601 so as to temporarily convert the image into projection data for one horizontal line (one-dimensional data) (step S620). The processing from step S602 is sequentially performed. Upon the one-dimensional data being sequentially input to the optical shading correction unit 202, each sequentially input line is multiplied by a correction gain that is determined for and multiplied by the corresponding line of an exposure image. The correction processing in the WB processing unit 203 is performed in the similar manner. After the processed dark image data for one screen is generated, correction processing based on the parameter for the first line of the next exposure image is applied to the one-dimensional data input next. The result is then added to the processed dark image data for the first line of the previous screen. By repeating this, combined dark image data is generated by combining as many pieces of processed dark image data as the number of combined images. However, the present invention is not limited to this configuration. The optical shading correction processing may be performed after the one-dimensional data is temporarily converted into two-dimensional image data in a memory by copying the one-dimensional data as many times as the number of lines.

Figure 10B:
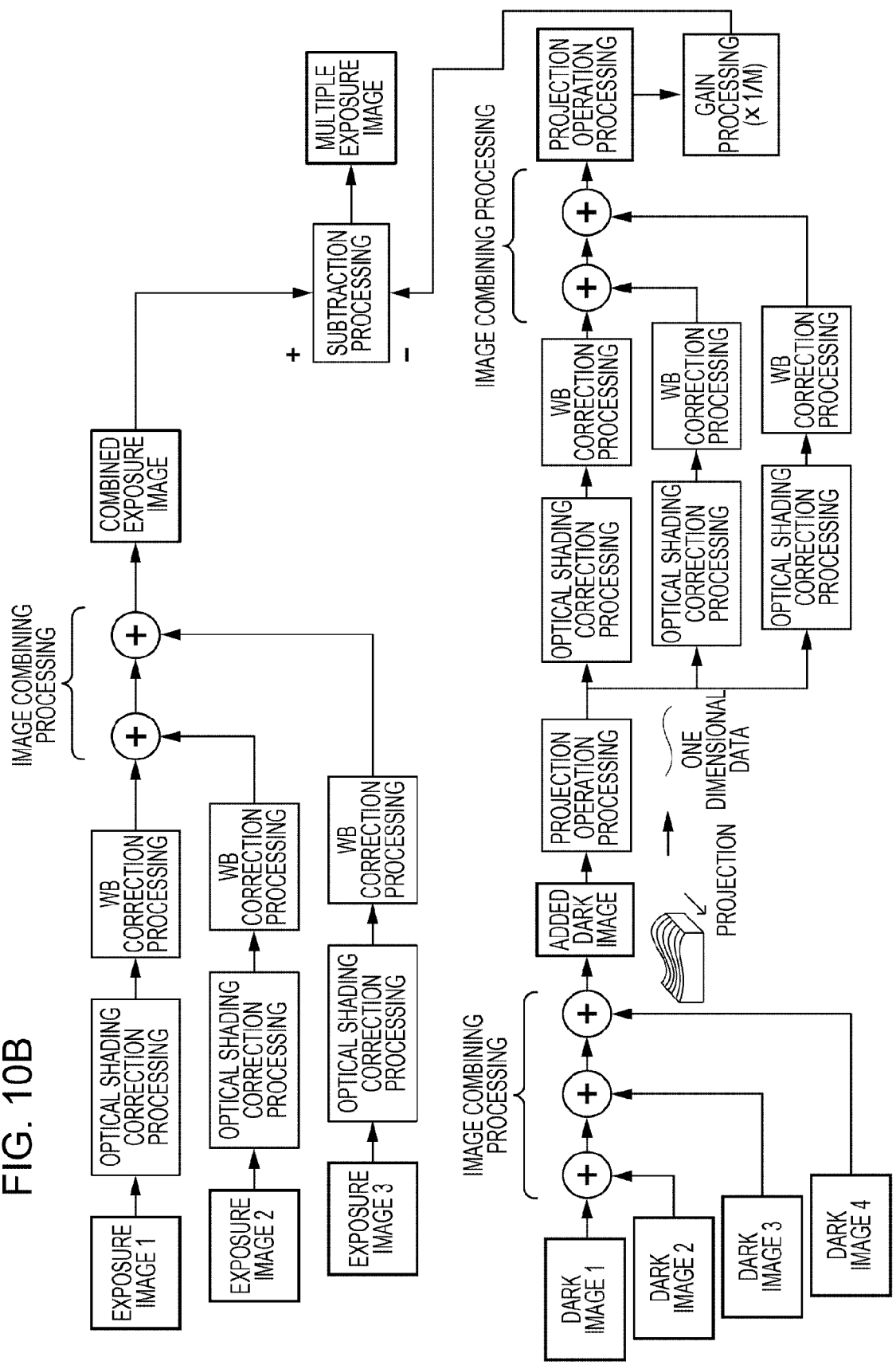
FIG. 10B is a diagram of the flow of the image processing in the fourth embodiment.

FIG. 10B illustrates a processing sequence performed on images in this embodiment.

Since the average of each column is calculated in projection operation processing of step S620 in this embodiment, the influence of random noise may be reduced and the decrease in the S/N ratio of the image of multiple-exposure shooting may be suppressed.

As described above, in this embodiment, dark images are captured separately from exposure images captured in multiple-exposure shooting. A reference image is generated by performing a projection operation on an added image of the dark images. On the basis of the generated reference image, images are generated which correspond to the exposure images and on which image processing equivalent to that for the corresponding exposure images has been performed. Combined dark image data obtained by combining those images is subtracted from combined exposure image data obtained by combining the exposure images resulting from main shooting.

In this manner, deteriorations such as vertical streaks and horizontal dark shading in multiple-exposure shooting may be reduced. However, unlike the third embodiment, noise components that fluctuate in the vertical direction, such as defects and horizontal streaks, are not to be reduced. Nevertheless, even when the number of captured dark images M is small, the influence of random noise may be reduced and the decrease in the S/N ratio of the corrected image may be prevented by performing a projection operation on the added dark image. In addition, when different correction is applied depending on the position (coordinates), fixed pattern noise may be corrected accurately by performing the optical shading correction processing on an image that is obtained by converting projection data into two-dimensional data.

Although the projection operation processing of step S620 is projection in the vertical direction herein, this may be projection in the horizontal direction obviously. In this case, noise components that may be reduced are horizontal streaks and vertical shading.

For example, the larger 'M', which represents the number of added dark images, is more desirable since the random noise reduction effect and the calculation accuracy improvement effect may be obtained. However, this embodiment may be performed by setting M to 1. When M is small, the time for dark shooting is short. Thus, the waiting time of a photographer may be shortened and the operability may be improved.

Furthermore, the accumulation period in dark shooting may be different from that for exposure images. The shorter the accumulation period, the further the time for dark shooting may be shortened and the further the operability for the photographer may be improved.

Conversely, the accumulation period in dark shooting may be equal to that for exposure images. In that case, noise due to dark current of the image pickup element 102 may be also corrected and reduced.

In addition, the description has been given assuming that the same number of images (N) is combined in combining dark images and in combining exposure images. However, the number of images to be combined may differ between exposure images and dark images. For example, when some of exposure images to be combined have already undergone correction processing using a method similar to the present invention, correction of those images is unnecessary and corresponding dark images may be omitted in the dark image combining processing.

(Fifth Embodiment)

In the first embodiment, horizontal and vertical fixed pattern noise may be corrected but the influence of random noise is large. In the fourth embedment, random noise may be corrected by adding M dark images and performing a projection operation but correction of horizontal or vertical fixed pattern noise has to be given up.

Accordingly, a feature of a fifth embodiment is that the processing of generating dark correction values using dark images is selected from the above-described two kinds of processing depending on a shooting setting of multiple-exposure shooting.

Assume that the configuration of the entire image capturing apparatus is the same as that of the first embodiment illustrated in FIG. 2, and the internal blocks of the DSP 106 are the same as that of the second embodiment illustrated in FIG. 7. That is, both the processing of generating dark correction values of step S312 in the first embodiment and the processing of generating dark correction values of step S312 in the fourth embodiment can be implemented.

Specific shooting conditions for use in selection of the processing of generating dark correction values include the number of to-be-combined images, an ISO speed, and a temperature of the image pickup element 102. For example, when the number of to-be-combined images is a predetermined value or less, the processing of generating dark correction values (processing A) in the fourth embodiment which is good at correcting random noise is selected. On the other hand, when the number of to-be-combined images exceeds the predetermined value, the processing of generating dark correction values (processing B) in the first embodiment capable of correcting the vertical and horizontal fixed pattern noise is selected. In addition, when the ISO speed is equal to a predetermined value or less, the processing A is selected. When the ISO speed exceeds the predetermined value, i.e., ISO 1600, the processing B is selected. Alternatively, when the temperature of the image pickup element 102 is equal to a predetermined temperature or lower, the processing A is selected. When the temperature exceeds the predetermined temperature, the processing B is selected. Furthermore, the processing may be decided by combining these conditions. For example, a table for deciding the processing A or B in a three-dimensional matrix of the number of to-be-combined images, the ISO speed, and the temperature of the image pickup element may be created and used in determining the processing. The temperature of the image pickup element 102 may be estimated by measuring air temperature in the vicinity of the image pickup element using a thermometer not illustrated.

The dark-correction-value processing is selected when shooting conditions are set in step S301. That is, once the number of to-be-combined images, the ISO speed, the temperature of the image pickup element 102, etc. described above being set as shooting conditions, the aforementioned determination is performed and the processing A or B is decided in accordance with the set shooting conditions. If the processing A or B is decided, the number of dark images to be captured and the dark-correction-value processing are uniquely decided.

As described above, in this embodiment, dark images are captured separately from exposure images captured in multiple-exposure shooting. A reference image is generated by performing a projection operation on an added image of the dark images. On the basis of the generated reference image, images are generated which correspond to the exposure images and on which image processing equivalent to that for the corresponding exposure images has been performed. Combined dark image data obtained by combining those images is subtracted from combined exposure image data obtained by combining the exposure images resulting from main shooting. Alternatively, dark images are captured separately from exposure images captured in multiple-exposure shooting. From the dark images, images are generated which correspond to the exposure images and on which image processing equivalent to that for the corresponding exposure images has been performed. Combined dark image data obtained by combining those images is subtracted from combined exposure image data obtained by combining the exposure images resulting from main shooting. By selectively performing the above two kinds of processing in accordance with the shooting conditions, noise correction suitable for the shooting conditions may be performed.

While preferable embodiments of the present invention have been described above, the present invention is not limited to these embodiments and can be variously modified and altered within the scope of the gist thereof.

For example, the larger 'M', which represents the number of added dark images, is more desirable since the random noise reduction effect and the calculation accuracy improvement effect may be obtained. However, this embodiment may be performed by setting M to 1. When M is small, the time for dark shooting is short. Thus, the waiting time of a photographer may be shortened and the operability may be improved.

Furthermore, the accumulation period in dark shooting may be different from that for exposure images. The shorter the accumulation period, the further the time for dark shooting may be shortened and the further the operability for the photographer may be improved.

Conversely, the accumulation period in dark shooting may be equal to that for exposure images. In that case, noise due to dark current of the image pickup element 102 may be also corrected and reduced.

Also, to prevent overcorrection, the subtraction processing may be performed on the combined exposure image after the dark correction values are multiplied by a correction coefficient k (k is equal to 1 or less). When this is performed, the gain multiplied in the gain processing unit 209 is set to k/M.

In addition, the description has been given assuming that the same number of images is combined in combining dark images and in combining exposure images. However, the number of images to be combined may differ between exposure images and dark images. For example, when some of exposure images to be combined have already undergone correction processing using a method similar to the present invention, correction of those images is unnecessary and corresponding dark images may be omitted in the dark image combining processing.

In addition, in this embodiment, as the processing A and processing B between which the processing of generating dark correction values is switched, the processing in the first embodiment and the processing in the fourth embodiment are used. However, the present invention is not limited to this configuration. The processing of generating dark correction values disclosed in the first and third embodiments can correct horizontal and vertical fixed pattern noise but the influence of random noise is large. The processing of generating dark correction values disclosed in the second and fourth embodiments can correct random noise by adding M dark images but correction of horizontal or vertical fixed pattern noise has to be given up. That is, the processing of generating dark correction values disclosed in the first or third embodiment may be used as the aforementioned processing B, whereas the processing of generating dark correction values disclosed in the second or fourth embodiment may be used as the processing A.

Furthermore, in each of the above embodiments, dark image data is obtained through shooting during shooting of exposure image data. However, the method for obtaining dark image data is not limited to this one, and dark image data pre-stored in a memory at the time of shipment may be obtained. This dark image data may result from shooting performed before shipment or may be calculated from various conditions.

(Other Embodiments)

An object of an example of the present invention can be also achieved in the following manner. Specifically, a storage medium storing program code of software in which a procedure for implementing the functions of each of the above-described embodiments is written is supplied to a system or apparatus. A computer (or a CPU, MPU, etc.) of the system or apparatus reads out and executes the program code stored on the storage medium.

In this case, the program code read out from the storage medium may implement some of the novel functions of the present invention, and the program and the storage medium storing the program code constitute an example of the present invention.

In addition, examples of the storage medium for supplying the program code include a flexible disk, a hard disk, an optical disc, and a magneto-optical disk. A CD-ROM, CD-R, CD-RW, DVD-ROM, DVD-RAM, DVD-RW, DVD-R, magnetic tape, nonvolatile memory card, ROM, etc. can also be used.

By enabling a computer to execute the read out program code, the functions of each of the above-described embodiments are implemented. An example of the present invention further includes a case in which the OS (operating system) that is operating in the computer or the like performs part or the entirety of actual processing in accordance with instructions of the program code, and the functions of each of the above-described embodiments are implemented through the processing.

Moreover, the following case is also included. The program code read from the storage medium is first written in a memory included in a function expansion board inserted into the computer or a function expansion unit connected to the computer. Then, the CPU or the like included in the function expansion board or function expansion unit performs part or the entirety of actual processing in accordance with instructions of the program code.

The present invention is not limited to the above embodiments and can be variously modified and altered without departing from the spirit and scope of the present invention. Accordingly, the following claims are attached in order to clarify the scope of the present invention.

According to an example of the present invention, an image capturing apparatus capable of obtaining a high-quality multiple exposure image by reducing fixed pattern noise (such as vertical streaks, horizontal streaks, defects, and dark shading) in multiple-exposure shooting may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/073385, filed Oct. 12, 2011, which is hereby incorporated by reference herein in its entirety.

The invention claimed is:

1. An image capturing apparatus comprising:
an image pickup configured to capture an image of a subject and output image data;
an image processor configured to perform image processing on image data output from the image pickup;
a combiner configured to combine a plurality of pieces of image data;
a corrector configured to correct the combined exposure image data; and
a controller configured to perform control so that
the image pickup performs image capturing with an image pickup element of the image pickup being exposed to light, thereby obtaining a plurality of pieces of exposure image data,
the image processor performs image processing on the plurality of pieces of exposure image data,
the combiner combines the plurality of pieces of exposure image data output from the image processor so as to generate combined exposure image data,
the image pickup performs image capturing without the image pickup element being exposed to light, thereby obtaining a plurality of pieces of dark image data,
the combiner generates one piece of dark reference image data by using the plurality of pieces of dark image data,
the image processor performs, on the one piece of dark reference image data, image processing that uses a parameter based on a parameter of the image processing performed on each of the plurality of pieces of exposure image data, and outputs a plurality of pieces of processed dark image data corresponding to the plurality of pieces of exposure image data,
the combiner combines the plurality of pieces of processed dark image data output from the image processor so as to generate combined dark image data, and
the corrector corrects the combined exposure image data in accordance with the combined dark image data.

2. The image capturing apparatus according to claim 1, wherein the combiner combines a plurality of pieces of image data by addition.

3. The image capturing apparatus according to claim 1, wherein the image processing performed by the image processor includes optical shading correction processing.

4. The image capturing apparatus according to claim 1, wherein the image processing performed by the image processor includes white balance correction processing.

5. The image capturing apparatus according to claim 1, wherein the corrector subtracts the combined dark image data from the combined exposure image data.

6. The image capturing apparatus according to claim 1, wherein the combiner adds the plurality of pieces of dark image data so as to generate the one piece of dark reference image data, and outputs the generated one piece of dark reference image data.

7. The image capturing apparatus according to claim 1, wherein the combiner adds the plurality of pieces of dark image data so as to generate combined image data, averages the combined image data in the vertical direction or horizontal direction so as to convert the combined image data into one-dimensional data, copies the one-dimensional data over one screen so as to convert the one-dimensional data into image data for one screen, thereby generating and outputting the one piece of dark reference image data.

8. The image capturing apparatus according to claim 1, wherein the image processor determines the parameter in accordance with a shooting condition that includes at least one of the type of an image pickup lens, a zoom position of the lens, an aperture, a shutter speed, an ISO speed setting, and a temperature, and performs the image processing by using the parameter.

9. The image capturing apparatus according to claim 1, wherein the controller is capable of executing
first correction processing in which the controller performs control so that the image pickup performs image capturing without the image pickup element being exposed to light, thereby obtaining a plurality of pieces of dark image data; the combiner generates one piece of dark reference image data by using the plurality of pieces of dark image data; the image processor performs, on the one piece of dark reference image data, image processing equivalent to image processing performed on each of the plurality of pieces of exposure image data and outputs a plurality of pieces of processed dark image data corresponding to the plurality of pieces of exposure image data; the combiner combines the plurality of pieces of processed dark image data output from the image processor so as to generate combined dark image data; and the corrector corrects the combined exposure image data in accordance with the combined dark image data, and second correction processing in which the controller performs control so that the image pickup performs image capturing without the image pickup element being exposed to light, thereby obtaining a plurality of pieces of dark image data; the image processor performs, on each of the plurality of pieces of dark image data, image processing that uses a parameter based on the parameter of the image processing performed on the corresponding one of the plurality of pieces of exposure image data; the combiner combines the plurality of pieces of dark image data output from the image processor so as to generate combined dark image data; and the corrector corrects the combined exposure image data in accordance with the combined dark image data, and the controller selectively executes one of the first correction processing and the second correction processing depending on a set shooting condition.

10. The image capturing apparatus according to claim 9, wherein the set shooting condition includes at least one of the number of pieces of exposure image data to be captured, an ISO speed, and a temperature of the image pickup element.

11. The image capturing apparatus according to claim 1, wherein the number of the exposure image data obtained by the image pickup is N, the number of the dark image data obtained by the image pickup is M, and M does not equal N.

12. A method for controlling an image capturing apparatus, comprising:
a first image capturing step of performing image capturing with an image pickup element being exposed to light, thereby obtaining a plurality of pieces of exposure image data;
a first image processing step of performing image processing on the plurality of pieces of exposure image data;
a first combining step of combining the plurality of pieces of exposure image data so as to generate combined exposure image data;
a second image capturing step of performing image capturing without the image pickup element being exposed to light, thereby obtaining a plurality of pieces of dark image data;
a generation step of generating one piece of dark reference image data by using the plurality of pieces of dark image data;
a second image processing step of performing, on the one piece of dark reference image data, image processing that uses a parameter based on a parameter of the first image processing performed on each of the plurality of pieces of exposure image data, and outputting a plurality of pieces of processed dark image data corresponding to the plurality of pieces of exposure image data;
a second combining step of combining the plurality of pieces of processed dark image data so as to generate combined dark image data; and
a correction step of correcting the combined exposure image data in accordance with the combined dark image data.

13. A non-transitory computer-readable storage medium having a program stored thereon, the program causing a computer to execute each step of the method for controlling an image capturing apparatus according to claim 12.

14. An image capturing apparatus comprising:
an image pickup configured to capture an image of a subject and output image data;
an image processor configured to perform image processing on image data output from the image pickup;
a combiner configured to combine a plurality of pieces of image data;
a corrector configured to correct the combined exposure image data; and
a controller configured to perform control so that
the image pickup performs image capturing with an image pickup element of the image pickup being exposed to light, thereby obtaining a plurality of pieces of exposure image data,
the image processor performs image processing on the plurality of pieces of exposure image data,
the combiner combines the plurality of pieces of exposure image data output from the image processor so as to generate combined exposure image data,
the image pickup performs image capturing without the image pickup element being exposed to light, thereby obtaining one piece of dark image data,
the combiner generates one piece of dark reference image data by using the one piece of dark image data,
the image processor performs, on the one piece of dark reference image data, image processing that uses a parameter based on a parameter of the image processing performed on each of the plurality of pieces of exposure image data, and outputs a plurality of pieces of processed dark image data corresponding to the plurality of pieces of exposure image data,
the combiner combines the plurality of pieces of processed dark image data output from the image processor so as to generate combined dark image data, and
the corrector corrects the combined exposure image data in accordance with the combined dark image data.

* * * * *